United States Patent [19]

Deshpande et al.

[11] Patent Number: 5,797,826
[45] Date of Patent: Aug. 25, 1998

[54] HYDROSTATIC SHOE FOR CONTROLLED CROWN ROLLS

[75] Inventors: Rajendra D. Deshpande, Rockton, Ill.; James P. Alfano, Janesville, Wis.

[73] Assignee: Beloit Technologies, Inc., Wilmington, Del.

[21] Appl. No.: 726,308

[22] Filed: Oct. 2, 1996

[51] Int. Cl.$^6$ ........................................ B21B 7/00
[52] U.S. Cl. ........................ 492/7; 492/20; 162/358.3
[58] Field of Search ........................ 492/7, 4, 2, 20; 162/358.3, 358.1; 384/121, 122, 123

[56] References Cited

U.S. PATENT DOCUMENTS

| | | |
|---|---|---|
| 4,404,724 | 9/1983 | Christ et al. . |
| 4,815,183 | 3/1989 | Bondetti . |
| 4,825,520 | 5/1989 | Alajoutsijarvi et al. . |
| 4,852,229 | 8/1989 | Crouse . |
| 4,858,292 | 8/1989 | Buhllmann et al. . |
| 4,916,748 | 4/1990 | Schrörs . |
| 5,018,258 | 5/1991 | Niskanen . |
| 5,033,176 | 7/1991 | Schiel . |
| 5,146,838 | 9/1992 | Olson et al. ........................ 92/177 |
| 5,509,883 | 4/1996 | Niskanen ........................ 492/7 |
| 5,534,117 | 7/1996 | Roerig ........................ 162/358.3 |
| 5,650,048 | 7/1997 | Swietlik ........................ 162/358.3 |

*Primary Examiner*—Irene Cuda
*Attorney, Agent, or Firm*—Dirk J. Veneman; Raymond W. Campbell; Gerald A. Matthews

[57] ABSTRACT

A controlled crown roll utilizes a crown support piston with a glide shoe with a cavity in the face of the glide shoe centered under the nip loading line. The cavity is surrounded by a land area, the majority of which is located away from the nip load. Use of a low viscosity hydraulic fluid, for example, 15.6 cP, with a hydraulic film thickness of 0.002 inches, results in significantly lower friction between the glide shoe and the interior surface of the rotating mantle. Recesses in the piston sides form hydrostatic thrust bearings which perform the centering function for the piston and the glide shoe.

23 Claims, 3 Drawing Sheets

HYDROSTATIC SHOE FOR CONTROLLED CROWN ROLLS

FIELD OF THE INVENTION

The present invention relates to crown control in rolls and extended nip presses in general. More particularly, the present invention relates to an apparatus for crown control utilizing supporting hydraulic cylinders.

BACKGROUND OF THE INVENTION

The manufacture of paper involves many steps where the paper web is run between a nip formed between two rolls or between a roll and a shoe of an extended nip press. The purpose of a nip between rolls, or between a roll and a shoe, is to exert pressure on the paper web. Because modern paper manufacturing machines are up to four-hundred inches or more wide, loading the ends of the rolls fails to produce a uniform pressure across the nip formed between the rolls.

One solution to this problem is to form a gradual crown on the roll surfaces. The crown is in the form of a gradual increase in diameter of the roll toward the center. When a crowned roll is combined with a straight roll or another crowned roll, and the ends of the opposed rolls are brought together, a uniform pressure can be produced along the entire length of the rolls.

A problem associated with crowned rolls is that the rolls only develop a uniform pressure at one selected loading. This limitation can be of concern, as it is often desirable to change the compressive loading depending on the type and thickness of the paper being produced.

Another method of crown control involves placing a non-rotating support beam in the center of an outer rotating shell which forms the roll. The support beam supports one long piston, or a number of discrete hydraulic pistons, which engage the inner surface of the roll shell from within the roll in proximity to the nip and force the roll shell against an opposed roll. Such crown support rolls where the roll shell moves laterally relative to the support beam are known as self-loading controlled deflection rolls. When the support beam is used with a plurality of support pistons, each piston typically supports a hydrodynamic shoe which rides against the interior surface of the rotating mantle or roll. To reduce frictional forces between the hydrodynamic shoe, oil is typically pumped into a number of cavities formed into the upper surface of the shoe. The cavities serve to provide hydrodynamic support to the roll and to provide an oil film which separates the shoe from the roll surface. In a typical shoe cavity configuration, as illustrated is U.S. Pat. No. 4,825,520, a plurality of cavities are used with individual cavities disposed on opposite sides of the nip support line where the controlled deflection roll forms a nip with an opposed roll. The function of placing cavities on either side of the nip support line is to facilitate the self-centering of the hydrodynamic shell.

The loads imposed on the rotating shell in forming a nip between the shell and the opposed roll can be considerable. A typical load is approximately 750 pounds per linear inch. With the nip extending up to 400 inches, the load on the support shoes can exceed several hundred thousand pounds. When high loading is combined with a high tangential velocity for the sliding interface between the hydraulic support cylinders and the inside of the rotating shell or mantle, any frictional forces dissipate considerable energy. The velocity of the frictional interfaces is approximately the velocity of the paper web being formed. Typical web forming speeds are currently often in excess of 3,000 feet per minute. However, speeds in excess of 6,000 feet per minute are anticipated.

Horsepower requirements for turning the roll are proportional to the frictional forces between the rotating mantle and the hydrodynamic shoes and the linear velocity of the frictional interface. Frictional forces are a product of the nip load times the coefficient of friction. Thus, reducing the coefficient of friction between the glide shoes and the interior surface of the rotating mantle is critical to reducing the horsepower requirements of the controlled deflection roll. One straightforward solution is to increase the flow rate of hydraulic fluid between the glide shoes and the interior surface of the rotating mantle. This solution is less than satisfactory because excessive flow rates of hydraulic fluid entail costs associated with installed pump capabilities together with the power losses associated with the required pump power. At the same time, excessive flow rates run into engineering problems in supplying high flow rates to the hydraulic hydrodynamic interface between the glide shoes and the mantle's inner surface.

In U.S. Pat. No. 4,404,724 to Christ, et al. the use is suggested of a single cavity glide shoe which employs a sealing ledge which has a width which at most amounts to five or ten millimeters in width. The sealing ledge, along the perimeter, can be formed integrally with the piston. However, it is suggested that it preferably be fabricated from a material different from the plunger and inserted into a groove in the piston. The Christ, et al. patent suggests that considerably lower frictional forces are obtained with this design. However, Christ, et al. disclose that a considerable wearing-in of the sealing ledge can take place and furthermore, no means is provided for centering the piston under the nip.

What is needed is an improved controlled crown roll which requires lower horsepower to operate.

SUMMARY OF THE INVENTION

The controlled crown roll of this invention employs hydraulic support pistons which have a shoe with a single hydraulic cavity engaging and supporting the inside surface of a roll. The piston cavity is centered about the line of load formed at the nip between the controlled crown roll and a second roll. The load line defined by the nip between the rolls is supported by hydraulic fluid in the cavity. Unlike prior art crown support pistons which have multiple cavities in the face of the support shoe to center the piston beneath the load, the crown support piston utilized in this invention employs hydrostatic thrust bearings to accomplish this function. The bearings are formed between the sides of the piston and the piston cavity. Because hydrostatic thrust bearings provide the centering function, the support pistons need not tilt in order to develop centering forces. This lack of tilting allows a thinner oil film to be used. The thinner oil film in turn allows the use of a lower viscosity hydraulic fluid. The use of a lower viscosity hydraulic fluid, in combination with a higher hydraulic fluid pressure and a single cavity with lower land area, results in a crown support roll which has considerably lower frictional losses and at the same time a reasonable flow requirement for hydraulic fluids. An alternative embodiment crown support piston utilizes two cavities in the support shoe arrayed in the cross machine direction. The two cavities can provide cross machine centering while hydrostatic thrust bearings in the machine direction can provide machine direction centering.

It is a feature of the present invention to provide a controlled deflection roll with reduced friction between the rotating mantle and the support pistons.

It is another feature of the present invention to provide a controlled deflection roll with self-centering glide shoes.

It is a further feature of the present invention to provide a controlled deflection roll with reduced energy requirements.

It is a still further feature of the present invention to provide a controlled deflection roll with vibration isolation.

Further objects, features and advantages of the invention will be apparent from the following detailed description when taken in conjunction with the accompanying drawings.

DESCRIPTION OF THE PREFERRED EMBODIMENT

Figure 1:
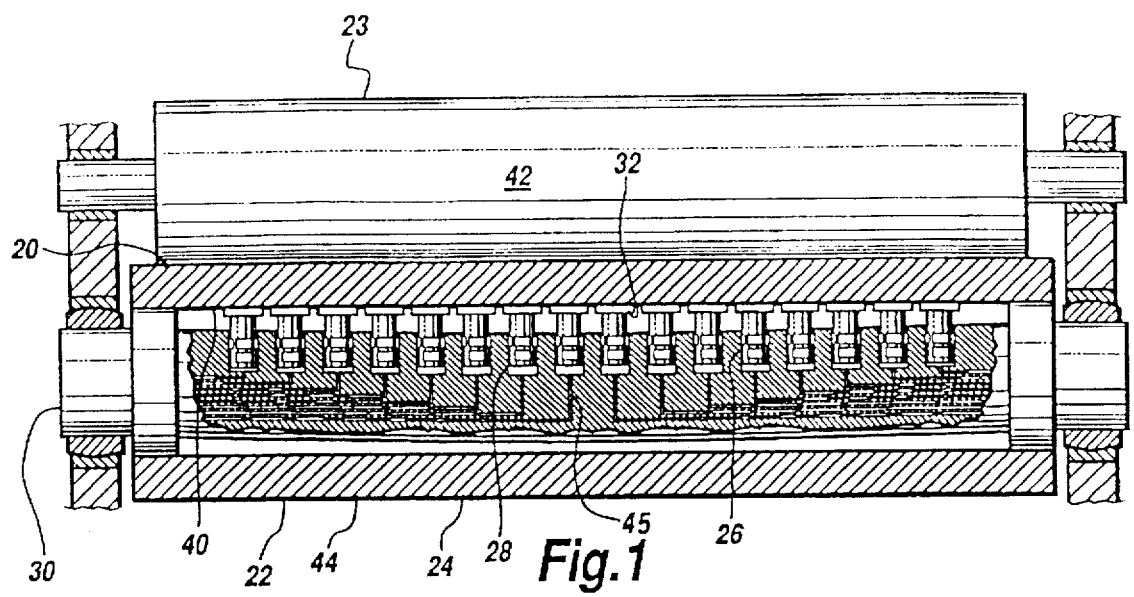
FIG. 1 is a cross machine elevational view, partly cut away in section, of the controlled deflection roll of this invention.

Referring more particularly to FIGS. 1–5, wherein like numbers refer to similar parts, a pair of opposed rolls forming a nip 20 are shown in FIG. 1. The lower roll 22 is of the crown controlled type. The crown controlled roll 20 has an outer shell 24 which is supported on a plurality of hydraulic cylinders with support pistons, or piston members, 26. The support pistons 26 are positioned in piston cavities 28 in a lateral support beam 30. Each piston member 26 has a support glide shoe, or shoe portion, 32 rigidly connected to, or integral with, a piston base, or piston portion, 34. The piston base 34 has a ring groove 37 which accepts a seal 33 which seals the piston base within the piston cavity 28. In the papermaking art, the piston base would typically be referred to simply as a piston. The glide shoe 32, which is typically referred to simply as a shoe in the papermaking art, has an upper surface 35 formed by machine direction lands 36 and cross machine direction lands 38. The upper surface 35 is positioned in supporting engagement to the inside surface 40 of the shell 24. Hydraulic pressure supplied by hydraulic lines 45 causes the hydraulic support pistons 26 to uniformly support the shell 24 against the upper roll 23.

Because the rolls 23, 22 are used in the manufacture or processing of paper and because the surfaces 42, 44 of the rolls are in non-slipping engagement with the paper web when in use, the rolls must rotate with a surface velocity which is equal to the velocity of the paper web being processed. Paper is currently being made at speeds in excess of 3,000 to as much as 6,000 feet per minute which requires a relatively high surface velocity for the rolls 23, 22. The lands 36, 38 of the shoe 32 make sliding frictional engagement with the inside surface 40 of the shell 24.

Oil is supplied to a cavity 46 in the surface, or face, 35 of the shoe 32. The oil is supplied under pressure from a port 48 and flows over the lands 38, 36 forming a film of oil which lubricates the inner surface 40 of the shell 22. The oil in cavity 46 hydrostatically supports the roll shell by applying pressure to its inner surface 40.

Figure 3:
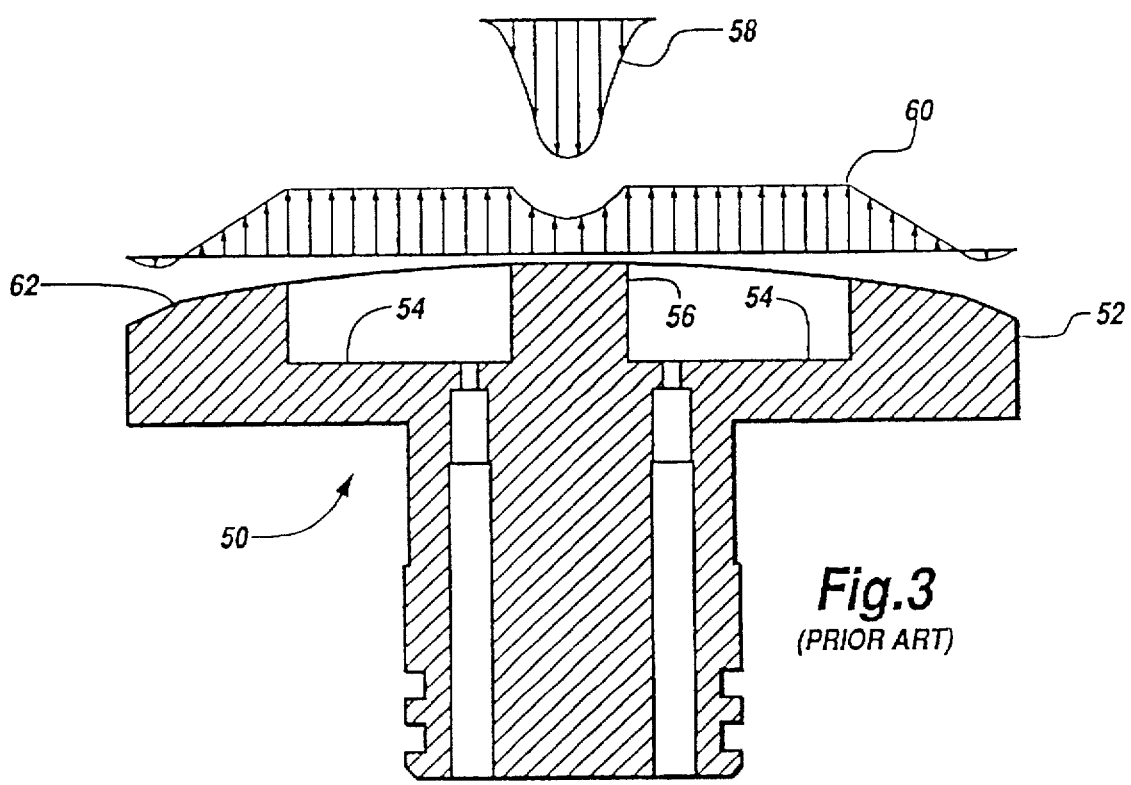
FIG. 3 is an illustrative cross-sectional view of a prior art piston illustrating the nip loads and the support provided by the glide shoes in a prior art device.

FIG. 3 shows a prior art hydraulic support piston 50 in a cross-sectional view taken in the machine direction. The piston has a shoe 52 which has four cavities 54. Two of the cavities in the machine direction are visible in FIG. 3. The cavities 54 are separated by a cross machine direction central land 56. FIG. 3 has an upper force diagram 58 which represents the shape and magnitude of a load created by the nip between two opposed rolls. A support force diagram 60 shows the support provided by the hydraulic fluid in the piston cavities 54 and by an oil film which forms on the central land 56 and the side lands 62. Prior art support pistons 50 have been typically built with cavities on either side of the nip because this construction provides a balancing force which prevents tilting of the piston 50 beneath the nip. An array of four cavities provides an anti-tilting, or centering, function in both the machine and cross machine directions.

The placement of hydraulic support cavities on either side of the nip necessitates a central land 56. A central land, as shown in FIG. 3, results in a force diagram region 61 of lower hydraulic support just where the imposed load, as illustrated by the upper force diagram 58, is greatest. The result of this mismatch in support and load is deflections which reduce the thickness of the oil film over the central land. The reduction in the oil film in turn leads to higher frictional forces.

The use of crown controlled rolls can be quite energy intensive. The energy required to drive a conventional roll is only that necessary to overcome the bearing friction at the mounts and some additional energy necessary to cause the bending deflection in a crowned roll. In a crown controlled roll on the other hand, the frictional engagement between the support pistons and the shell results in considerable frictional losses. Additionally, oil must be pumped into the cavities 54 in sufficient quantity to maintain the pressure within the cavity and maintain the oil film on the lands. The flow of oil is also important to remove the heat produced by the friction between the shell and the support pistons.

To understand the source of the high energy usage of a crown control roll, it is important to realize that work is equal to a force applied over a distance, and is typically measured in foot-pounds. The amount of work done per unit of time is power measured in horsepower or kilowatts. The amount of frictional force is dependent upon the normal force which in a typical papermaking application in the pressing section of a papermaking machine may be on the order of 750 pounds per linear inch. The total normal force is the force per linear inch times the width of the roll.

In Table 1, a number of designs are set forth based on a crown controlled roll which is 331 inches wide and is running at a machine speed of 3,450 feet per minute or 57.5 feet per second. The nip load in all cases is set at 750 pounds per linear inch. Thus the total load for the roll is 248,250 pounds. The coefficient of friction is dependent upon the oil film thickness and the oil viscosity. For the first example, the coefficient of friction is 0.0084 with a resultant frictional force of 2,085 pounds. Two thousand-and-eighty-five pounds force times 57.5 feet per second equals 119,900 foot-pounds per second, which is equivalent to 218 horsepower.

In addition to the horsepower consumed by friction in a crown control roll, an oil flow rate at the designed pressure must be supplied. The rate of oil flow times the pressure also results in a horsepower requirement. In addition to the amount of energy expended, other considerations govern the desirable oil flow rates. Too high a flow rates makes it difficult to provide adequate provisions for the flow of the oil through the crown control roll. High flow rates also require large high pressure pumps which in addition to being energy consumptive are expensive. On the other hand, too low of a flow of oil may be insufficient to remove all the heat generated by the frictional forces.

The prior art piston and shoe 50, 52, in order to develop restoring forces, must experience some tilting into or away from the machine direction. The tilting necessarily causes one of the side lands 62 to more closely approach the surface of the shell riding on the prior art shoe 52. When the oil film is decreased in thickness, local frictional forces increase together with additional heating. Thus in prior art hydraulic support pistons 50, it is necessary to maintain a relatively thick film layer in order to allow for tilting of the cylinder in order to develop centering forces without excessive frictional loads.

Figure 2:
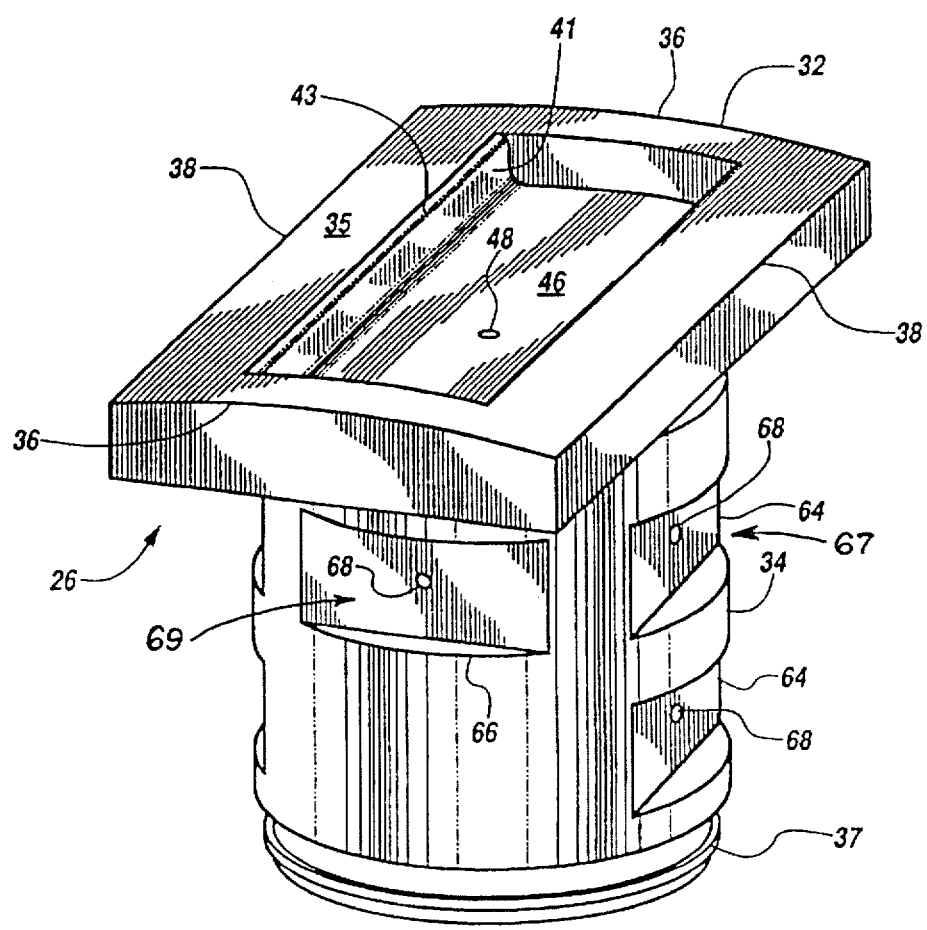
FIG. 2 is an isometric view of a crown support piston employed in the controlled deflection roll of FIG. 1.

In the hydraulic support piston 26 of this invention, shown in FIG. 2, a pair of hydrostatic thrust bearings 67, formed by a void 64 in the surface of the solid cylinder of the piston base 34, on the machine direction sides of the piston base 34 position the hydraulic support piston 26 in the machine direction. Additional hydraulic thrust bearings 66, similarly formed in the piston base by void 66 in the cross machine direction, position the hydraulic support piston 26 in the cross machine direction. Each hydrostatic thrust bearing 67, 69 is fed oil by a port 68. The voids 64, 66 cooperate with the opposed portion of the piston cavity to form a hydraulic pressure chamber to receive pressurized hydraulic fluid to permit the hydrostatic thrust bearings to operate to center the piston base and maintain it centered during operation of the roll.

Because the hydrostatic thrust bearings 67, 69 are static bearings, the required oil flows are extremely small. Because the centering function is not performed by cavities in the upper surface 35 of the shoe 32, a single cavity 46 may be utilized. The single cavity has no central land and the total land area is less than in the prior art support piston 50.

The use of hydrostatic thrust bearings 67, 69 to provide the self-centering functions for the support pistons 26 allows the use of a single hydraulic cavity in the shoe 32 and thus provides better matching of the hydraulic support to the nip load. The hydrostatic thrust bearings also provide vibration damping and allow the use of lower viscosity hydraulic support fluid. Decreasing hydraulic pump power results from a thinner film thickness between the support shoes and the inside surface 40 of the shell 24.

Figure 4:
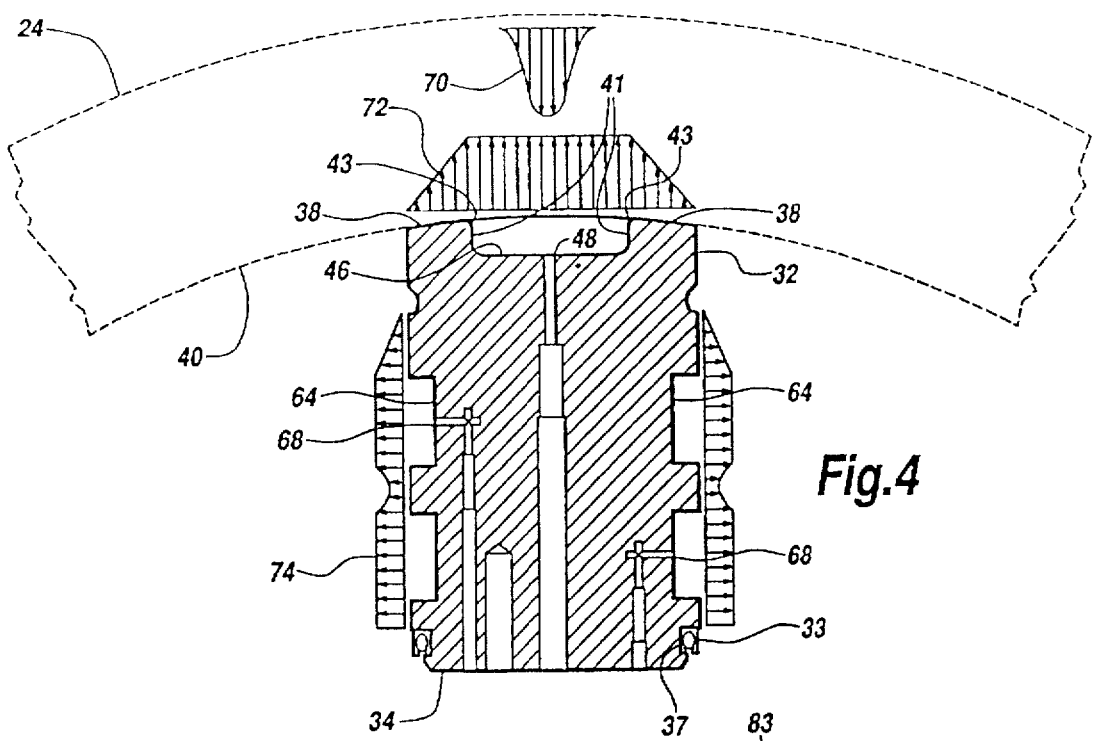
FIG. 4 is an illustrative cross-sectional view of the piston and glide shoe of FIG. 2, showing the nip load and the glide shoe support forces and thrust bearing loads.

FIG. 4 shows an upper force diagram 70 illustrative of the magnitude and distribution of the nip load. A lower force diagram 72 shows the forces produced by the hydraulic oil in the cavity 46 of the hydraulic support piston 26. As illustrated, the reaction forced produced by the hydraulic piston 26 is more appropriately matched to the nip loading.

The hydrostatic thrust bearings 67 produce side thrusts illustrated by force diagrams 74. For improved stability, the piston 26 has a plurality of hydrostatic thrust bearings positioned one above the other in the Z-direction, as shown in FIG. 2.

Referring to Table 1, improved design No. 3 may be compared with design No. 1, which is exemplary of a design employing prior art support cylinders. The improved shoe design results in a lower coefficient of friction which results in lower frictional horsepower and lower total horsepower. However because of the small surface area of cavity 46 of the support shoe 32, which cavity is exposed to the inner surface of the roll shell, a higher hydraulic pressure is required.

TABLE 1

| | | | | | | | | | | | |
|---|---|---|---|---|---|---|---|---|---|---|---|
| Optimization of the hydrostatic shoe | | | | | | | | | | | |
| Design | No. | cP | h in | $C_f$ | lb/in | Q gpm | $P_s$ psi | $H_p$ | $H_f$ | $H_t$ | K |
| Existing | 1 | 105 | 0.01 | 0.01 | $3.7 \times 10^6$ | 45 | 252 | 6.6 | 218 | 224.6 | 33 |
| Shoe | 2 | 105 | 0 | 0.02 | $11 \times 10^6$ | 1.7 | 252 | 0.3 | 634 | 634.3 | 2,113 |
| Improved | 3 | 105 | 0.01 | 0.01 | $1.7 \times 10^6$ | 55 | 482 | 15.5 | 142 | 157.5 | 9 |
| Shoe | 4 | 105 | 0 | 0.02 | $5.1 \times 10^6$ | 2 | 482 | 0.6 | 425 | 425.6 | 708 |
| | 5 | 15.6 | 0 | 0 | $5.1 \times 10^6$ | 14 | 482 | 3.9 | 63 | 66.9 | 16 | where, oil viscosity
h—film thickness
$C_f$—Coefficient of friction
film stiffness
Q—oil flow
$P_s$—supply pressure
$H_p$—pumping horsepower
$H_f$—friction horsepower
$H_t$—total horsepower
K—ratio of friction horsepower to pumping horsepower The higher pressure means more oil escapes over the lands 36, 38. Because of the desirability of reducing the total pump power requirement, design No. 4 shows the use of a narrower film thickness which reduces the hydraulic flow requirements to a mere two gallons per minute. The new shoe design No. 4 may be compared with a design No. 2 using a prior art shoe where the oil film thickness is also reduced. Here it can be seen, as in the comparison of the previous case, that total horsepower requirements have been decreased by approximately one-third.

The fifth case in Table 1 illustrates a design using the improved shoe wherein an oil of lower viscosity more suited for use with the film thickness of two thousandths of an inch is utilized. Though a lower viscosity oil increases oil usage, total horsepower falls dramatically to perhaps 30 percent of that in design No. 1. The improved hydraulic support cylinder 26 of this invention, as illustrated in FIGS. 1, 2 and 4, is more suitable for use with a film thickness of two thousandths of an inch than an existing shoe because there is no need for tilting of the shoe to develop centering forces. The centering forces in the hydraulic support cylinder 26 are provided by the hydrostatic thrust bearings 64, 66.

To minimize horsepower the ratio of friction power to pump horsepower, K, should be between one and three. In practical designs, this is difficult to achieve, but an examination of Table 2 shows that with an existing shoe, design No. 1 represents a more practical case than design No. 2. Of the designs using the improved shoes 26, designs Nos. 3 and 5 represent good practical designs.

In FIG. 4 a sealing ring 33 is positioned in a groove 37 and seals the piston base in the piston cavity 28.

In FIGS. 2 and 4 it can be seen that the sides 41 of the cavity which extend in the cross machine direction and towards which the inner shell surface 40 moves have a gradual curve, or rounded edge, 43 which provides a surface which does not scrape off the thin fluid film thus reducing friction.

Another advantage of using a hydrostatic thrust bearing to center the support pistons 26 is that they are completely hydrostatically supported and thus less able to transmit vibration between the shell 24 and the support pistons 26 or the support beam 30. This results in a considerable damping of vibration.

Figure 5:
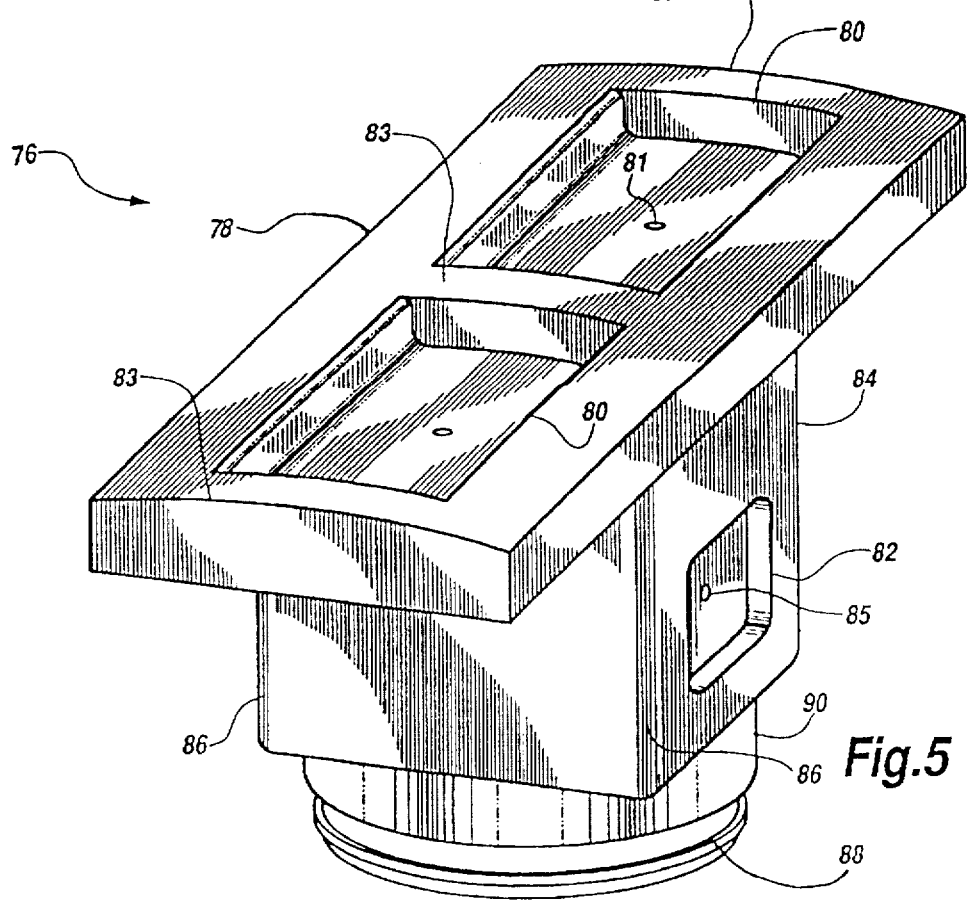
FIG. 5 is an isometric view of a piston employed in an alternative embodiment crown support roll of this invention.

An alternative hydraulic support piston 76 shown in FIG. 5, has two cavities 80 in the support shoe 78. The cavities 80 are aligned in the cross machine direction and thus providing centering in the cross machine direction. A single machine direction hydrostatic thrust bearing 82 on each side is then provided.

The cavities 80 are fed by oil supply ports 81 and the machine direction lands 83 present relatively little land area directly beneath the supported nip. Oil supply ports 85 supply oil to the machine direction thrust bearings 82.

The piston base 84 is square with rounded edges 86. The square base 84 when contained in a square piston cavity (not shown) can accommodate more bending of the support beam 30. Bending of the beam 30 in the negative Z-direction as shown in FIG. 1 would cause only a cross machine direction dimension change. Because there are no static thrust bearings in the cross machine direction, on the piston base 84 the piston cavity can be oversized to accommodate the beam deflection while leakage is minimized.

The sealing of the piston is provided by a sealing ring (not shown) which is contained in a groove 88 and which is integral to a short cylindrical section 90 of the piston.

It is understood that the invention is not limited to the particular construction and arrangement of parts herein illustrated and described, but embraces such modified forms thereof as come within the scope of the following claims.

We claim:

1. A paper web engaging roll assembly for use in a papermaking apparatus having machine and cross-machine directions, comprising, in combination:

a first cylindrical roll;

a second cylindrical roll having a hollow interior with an interior surface;

a stationary support beam disposed the hollow interior of the second roll extending longitudinally therein, wherein the second roll engages the first roll forming a nip therebetween;

a plurality of pistons mounted within a corresponding plurality of piston cavities formed in the support beam and aligned longitudinally therealong, wherein the pistons are operable to move in a nipward direction toward and away from the nip;

a glide shoe supported on each piston, wherein each glide shoe has an upper supporting face positioned in proximity to the interior surface of the second cylinder, wherein portions of the glide shoe define a cavity recessed below the supporting face, and wherein hydraulic fluid is discharged from the cavity to form a supportive film which is engaged between the glide shoe supporting face and the second cylinder interior surface to support said second cylinder in rotational engagement; and hydraulic thrust bearing means formed in each of the pistons in at least one of the cross-machine, or machine, directions, the hydrostatic thrust bearing means being so constructed and arranged as to cooperate with a corresponding cavity to operate to center the pistons in the piston cavities.

2. The roll assembly apparatus as set forth in claim 1, wherein:

there is at least one hydrostatic thrust bearing means on each of two opposed sides of each piston in the machine direction.

3. The roll assembly apparatus of claim 1, wherein:

there is at least one hydrostatic thrust bearing on each of two opposed sides of each piston facing in the machine direction.

4. The roll assembly apparatus of claim 2, wherein:

there is at least one hydrostatic thrust bearing on each side of each piston in both the machine direction and the cross machine direction.

5. The roll assembly apparatus of claim 2, wherein:

the thrust bearing means comprise thrust bearings;

there are at least two thrust bearings spaced apart in a Z-direction normal to a plane defined by the machine and cross machine directions.

6. The roll assembly apparatus of claim 1, wherein:

each of the plurality of pistons is substantially cylindrical in shape.

7. The roll assembly apparatus of claim 1, wherein:

each of the plurality of pistons has a substantially cylindrical portion adjacent the shoe, and a rectangular portion extending from the upper supporting surface of the shoe.

8. The roll assembly apparatus of claim 7, wherein:

the glide shoe has a first cavity and a second cavity in its face, the cavities arrayed longitudinally of the second roll, and in the cross machine direction, and separated by a land extending in the machine direction, and each cavity provides hydraulic support and the two arrayed first and second cavities provide centering in the cross-machine direction.

9. A paper web engaging roll assembly apparatus for use in a papermaking apparatus having machine and cross-machine directions, comprising, in combination:

a first cylindrical roll;

a second cylindrical roll having a hollow interior with an interior surface;

a stationary support beam disposed within the hollow interior of the second roll extending longitudinally therealong, wherein the second roll engages the first roll forming a nip therebetween;

a plurality of piston cavities formed in the support beam and aligned longitudinally therealong;

a piston mounted within each piston cavity, which piston is operable to move toward and away from the nip;

a glide shoe connected to each piston for engagement against the second roll interior surface, wherein each glide shoe has an interior surface engaging support face having portions which defines a hydraulic support cavity means, wherein each support cavity means has walls integrally formed with the shoe which encircle the cavity, the support face having upper land surfaces which are separated from the second roll interior surface by a hydraulic film of less than about 0.002 inches, wherein the upper land surfaces are about ½ to 1 inch wide, and wherein all upper land surfaces which extend in the cross machine direction do not underlie the nip.

10. The roll assembly apparatus of claim 9, wherein:

there is at least one hydrostatic thrust bearing on each of two opposed sides of each piston in the machine direction.

11. The roll assembly apparatus of claim 10, wherein:

there is at least one hydrostatic thrust bearing on each side of each piston in both the cross machine direction and the machine direction.

12. The roll assembly apparatus of claim 10, wherein:

there are at least two thrust bearings spaced apart in a Z-direction normal to a plane defined by the machine direction and the cross machine direction.

13. The roll assembly apparatus of claim 9, wherein:

there is at least one hydrostatic thrust bearing on each of two opposed sides of each piston, the said opposed sides of each piston being spaced from one another in the cross machine direction.

14. The roll assembly apparatus of claim 9, wherein:

each of the plurality of pistons is substantially cylindrical in shape.

15. The roll assembly apparatus of claim 9, wherein:

each of the plurality of pistons has a rectangular portion forming the glide shoe and a substantially cylindrical portion spaced from the shoe.

16. The roll assembly apparatus of claim 15, wherein:

there is at least one hydrostatic thrust bearing on each of two opposed sides of each piston in the machine direction and wherein the shoe has a first and a second cavity arrayed in the cross machine direction separated by a land in the machine direction, each cavity providing hydraulic support and the two arrayed cavities providing centering in the machine direction.

17. A controlled deflection roll for use in a papermaking machine having machine and cross-machine directions, for nipping engagement with a mating roll, the controlled deflecting roll comprising, in combination:

a hollow, cylindrical roll shell having interior and exterior cylindrical surfaces;

a support beam extending longitudinally within the roll shell and forming a space between the support beam and the interior roll shell surface;

a plurality of piston cavities formed in the support beam and aligned in spaced adjacency along the longitudinal length of the support beam;

a corresponding plurality of piston means disposed in a corresponding piston cavity, at least one of the piston means having a glide shoe portion having a support face for engaging the interior surface of the roll shell, and a piston portion for reciprocal movement in a piston cavity, the glide shoe face having at least one cavity in its support face for maintaining roll shell support hydraulic fluid under pressure, and at least a pair of hydrostatic thrust bearing cavities in the piston portion for receiving hydraulic fluid under pressure so as to cooperate with the piston cavities to provide piston means centering forces to maintain the piston means centered in the piston cavities during operation.

18. A controlled deflection roll as set forth in claim 17, wherein:

the glide shoe face has a plurality of cavities aligned at substantially normal array to the longitudinal extent of the piston means.

19. A controlled deflection roll as set forth in claim 18, wherein:

the piston has a quadrangular-shaped cross section;

the thrust bearing cavities are disposed in the piston portions in opposed array in the machine direction and are so constructed and arranged as to cooperate with the corresponding piston cavity under hydraulic pressure to operate to center the piston portions in the piston cavities.

20. A piston member for use in a controlled deflection roll having a hollow, cylindrical roll shell with inner and outer surfaces, and having a support beam including a plurality of piston cavities for receiving the piston members, the piston member comprising:

a piston portion having thrust bearing means for cooperating with a piston cavity to provide centering of the piston member within the piston cavity;

a glide shoe portion integral with the piston portion, the glide shoe portion having a face for providing support to the inner surface of the roll shell.

21. A piston member as set forth in claim 20, wherein:

the thrust bearing means comprises at least a pair of opposed voids disposed on the piston portion for defining, with the opposed portion of a respective piston cavity, a hydraulic pressure chamber for receiving pressurized hydraulic fluid for operating on the piston portion to center and maintain the piston portion centered within its piston cavity during operation of the controlled deflection roll.

22. A piston member as set forth in claim 20, wherein:

the thrust bearing means includes at least two pair of opposed voids, the opposed pairs being disposed in the piston portion at 90° to one another.

23. A piston member as set forth in claim 20, wherein:

the trust bearing means comprise at least two pairs of voids spaced apart in a Z-direction normal to a plane defined by the machine and cross-machine directions relative to the controlled deflection roll.

* * * * *

UNITED STATES PATENT AND TRADEMARK OFFICE
CERTIFICATE OF CORRRECTION

PATENT NO. : 5,797,826
DATED : Aug. 25, 1998
INVENTOR(S) : Deshpande, et al.

It is certified that error appears in the above-identified patent and that said Letters Patent is hereby corrected as shown below:

On the title page, in item [56] References Cited, insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | DE | 90 | 0 | 65 | 2 | 2 | 0 | 10/1991 | Germany | | | | |
| | | | | | | | | | | | | | | |

Signed and Sealed this

Thirteenth Day of April, 1999

*Attest:*

*Attesting Officer*

Q. TODD DICKINSON

*Acting Commissioner of Patents and Trademarks*